UNITED STATES PATENT OFFICE.

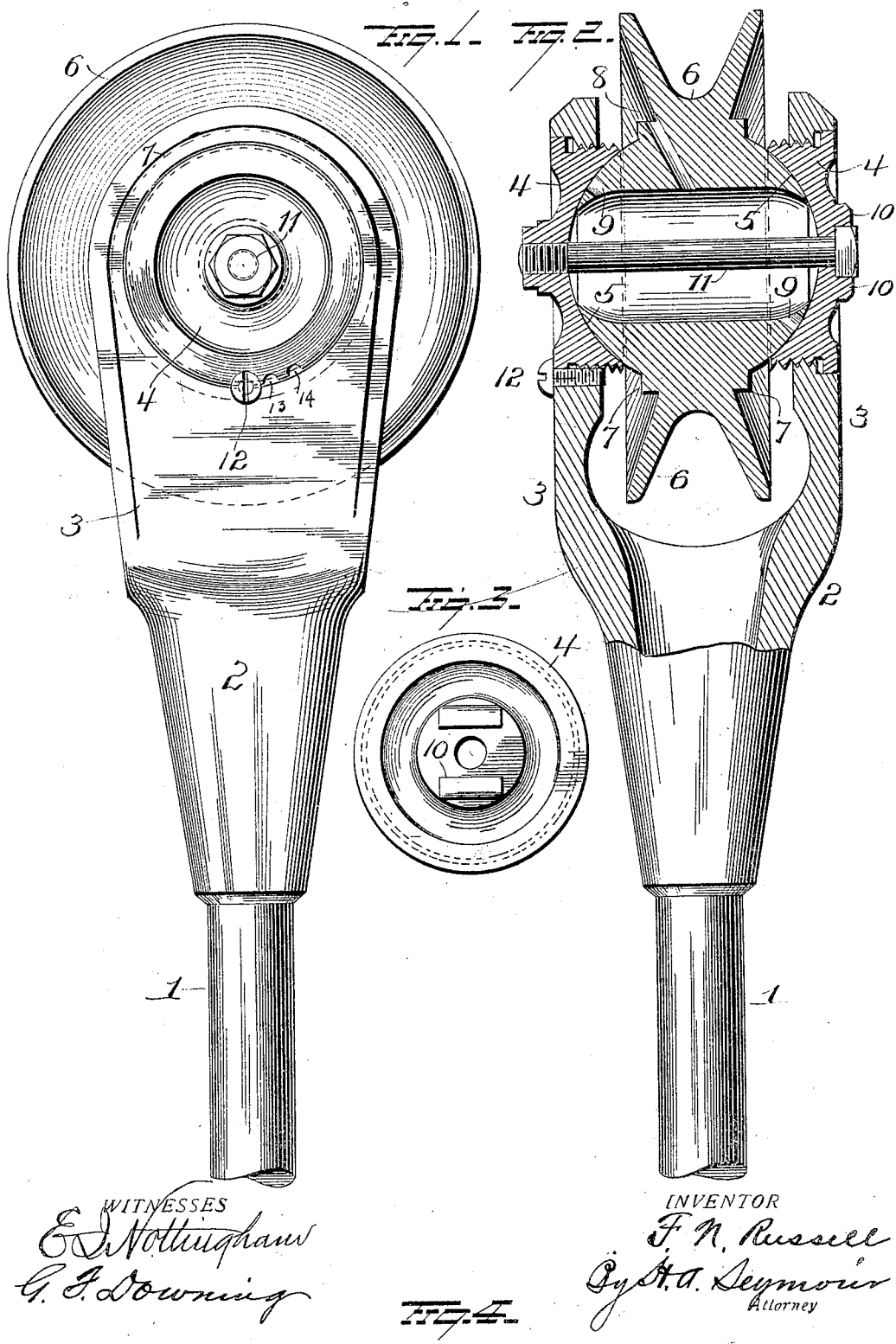

FRANK N. RUSSELL, OF ELMIRA, NEW YORK, ASSIGNOR OF ONE-HALF TO ALBERT D. LANE, OF SHOSHONE AGENCY, WYOMING.

TROLLEY-WHEEL AND MOUNTING THEREFOR.

No. 805,096.     Specification of Letters Patent.     Patented Nov. 21, 1905.

Application filed April 15, 1905. Serial No. 255,804.

*To all whom it may concern:*

Be it known that I, FRANK N. RUSSELL, a resident of Elmira, in the county of Chemung and State of New York, have invented certain new and useful Improvements in Trolley-Wheels and Mountings Therefor; and I do hereby declare the following to be a full, clear, and exact description of the invention, such as will enable others skilled in the art to which it appertains to make and use the same.

My invention relates to improvements in trolley-wheels and mountings therefor, the object of the invention being to provide improvements of this character in which the trolley-wheel is so mounted as to permit its lateral tilting to accommodate itself to varying positions of the trolley-wire, particularly while rounding a curve; and the invention consists in certain novel features of construction and combinations and arrangements of parts, as will be more fully hereinafter described, and pointed out in the claims.

In the accompanying drawings, Figure 1 is a perspective view illustrating my improvements. Fig. 2 is a view in longitudinal cross-section, and Figs. 3 and 4 are views of details of construction.

1 represents a trolley-pole provided at one end with my improved harp 2, having general fork formation, made with wide flat parallel side members 3, as clearly shown. These flat side members 3 are provided with alined screw-threaded openings to receive bearing blocks or cups 4, screwed therein. These cups 4 are made on their inner faces with spherical sockets or bearings to receive the spherical journals or enlargements 5 at the sides of my improved trolley-wheel 6. The trolley-wheel is provided around its journals or enlargements 5 with annular shoulders 7 to engage the bearing blocks or cups 4 and limit the lateral tilting movement of the trolley-wheel, yet not interfere with the free rotary movement thereof.

The trolley-wheel 6 is made hollow to form a lubricant-receptacle, into which the lubricant can be inserted through an inlet-port 8 at one side, and openings 9 are made in the trolley-journals to permit free passage of the lubricant to the bearings.

The bearing block or cup at one side is made with an angular socket formed by parallel lugs 10 to receive and hold the head of a bolt 11 against turning, and said bolt passes through comparatively large openings in the walls of the trolley and is screwed into an opening in the other bearing block or cup, and said latter cup, or both, if desired, is or are held against turning by means of a lock-screw 12, screwed into an opening formed by alined notches 13 14 in the block or cup and harp. By providing several notches 14 in the block the latter can be secured at different adjustments, so as to cause the blocks to properly hold the spherical hub of the particular wheel placed between them with more or less pressure, as may be desired.

A great many changes might be made in the general form and arrangement of the parts described without departing from my invention, and hence I would have it understood that I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a fork, of bearing blocks or cups adjustable in the fork and having sockets therein, and a trolley-wheel having semispherical journals or enlargements having fixed relation to each other and to the wheel and mounted in said bearing blocks or cups.

2. The combination with a fork, of bearing blocks or cups screwed into openings in the fork, a trolley-wheel, semispherical journals or enlargements at the sides thereof having fixed relation to each other and to the wheel and located in the blocks or cups, and a bolt passed through said blocks and trolley-wheel.

3. The combination with a fork and adjustable bearing-blocks therein, of a rotary and laterally-tilting trolley-wheel having its journals located in the cups or blocks, a lubricant-chamber in the wheel and said journals having openings communicating with the lubricant-chamber.

4. The combination with a trolley-fork having threaded openings in its sides, of bearing blocks or cups screwed into said openings and having sockets in their inner faces, a trolley-wheel having semispherical journals located in the sockets, annular shoulders around said journals to limit the tilting of the wheel, a bolt passed through the blocks and wheel, an angular socket on one block for the head of the bolt and a threaded opening in the other block for the threaded end of the bolt.

5. The combination with a fork having sockets in its arms, of a trolley-wheel having spherical enlargements to enter said sockets and having a large central opening, a bolt passing through said opening and the arms of the fork for connecting the parts together and shoulders on the wheel to engage the arms of the fork.

6. The combination with a fork having sockets therein, of a trolley-wheel having spherical enlargements to turn in said sockets, and a clamping-bolt passed through the fork and through a wide opening in the wheel to hold the parts together.

7. The combination with a fork having sockets therein and shoulders adjacent to the sockets, of a wheel having spherical enlargements to enter and turn in said sockets and having a wide horizontal bore, a bolt passed through the fork and wheel and shoulders on the wheel to contact with the shoulders of the fork and limit the tilting movement of the wheel.

In testimony whereof I have signed this specification in the presence of two subscribing witnesses.

FRANK N. RUSSELL.

Witnesses:
  HENRY C. HAMILTON,
  JAMES M. HAMILTON.